UNITED STATES PATENT OFFICE.

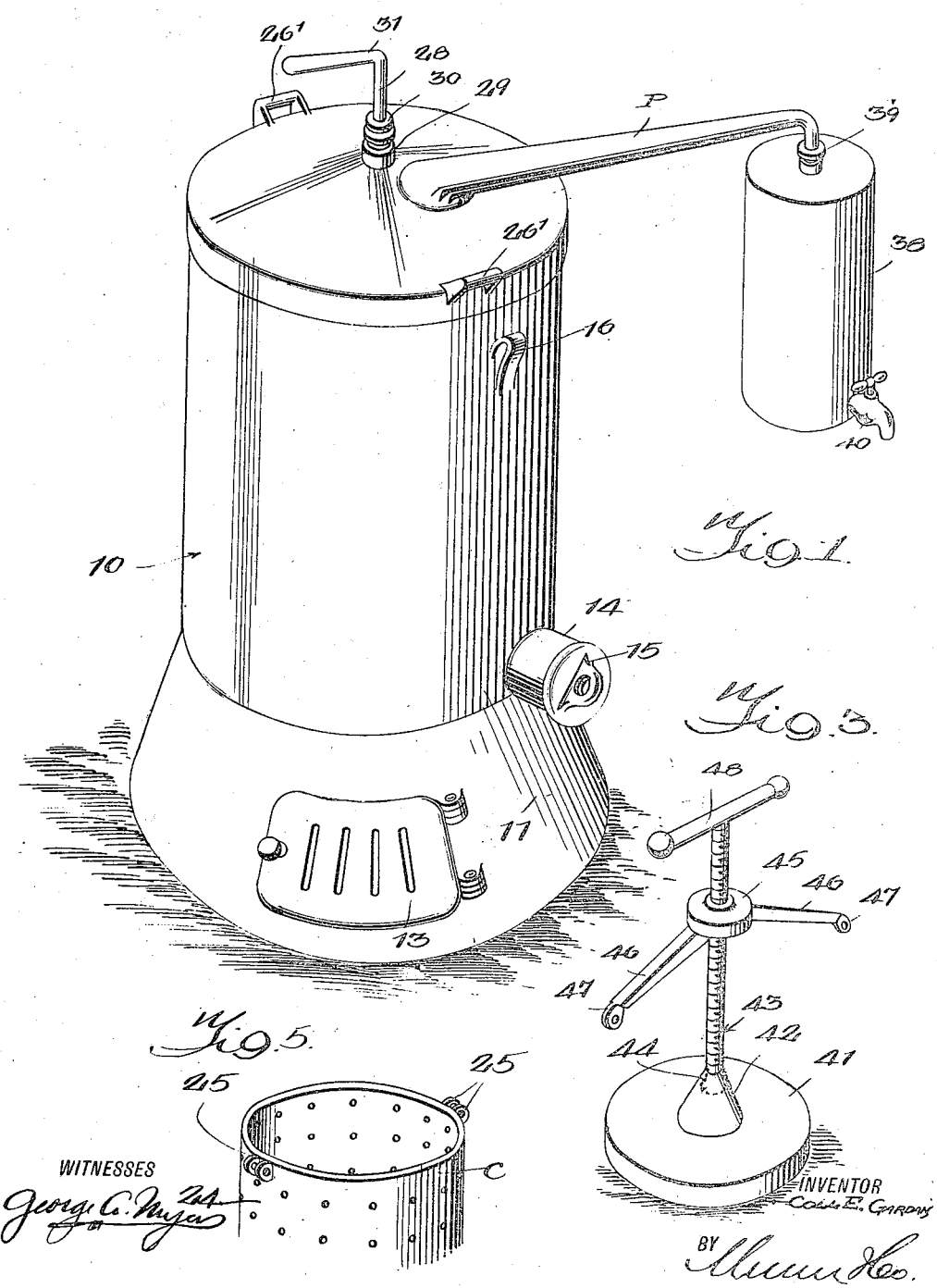

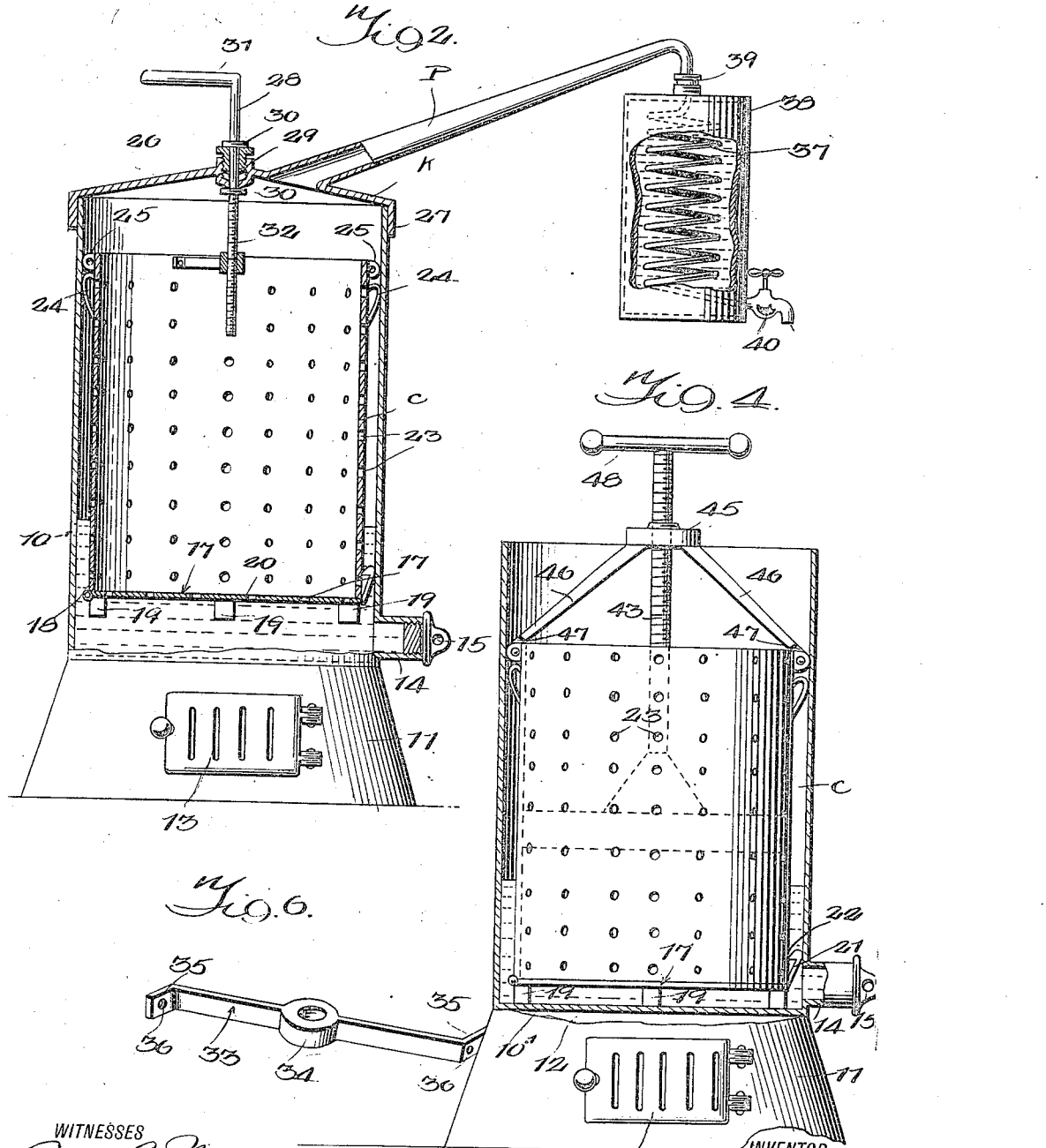

COLL E. GARDAN, OF WILSON CREEK, WASHINGTON.

METHOD OF EXTRACTING FERTILIZING ELEMENTS FROM MANURE.

1,422,434.  Specification of Letters Patent.  Patented July 11, 1922.

Application filed June 1, 1922. Serial No. 565,097.

*To all whom it may concern:*

Be it known that I, COLL E. GARDAN, a citizen of the United States, and a resident of Wilson Creek, in the county of Grant and State of Washington, have invented certain new and useful Improvements in Methods of Extracting Fertilizing Elements from Manure, of which the following is a specification.

This invention relates to an apparatus and method of extracting fertilizer from refuse or manure.

The object of the invention is to provide a method and apparatus of the above character whereby all fertilizer elements may be separated from the wood or fiber in manure or refuse and thus to produce a concentrated fertilizer and enable easy handling and transportation of the same.

It is also an object of the invention that the apparatus be adapted to operate economically and efficiently.

A further object of the invention is that the apparatus be adapted to permit the introduction of any necessary fertilizing elements not present in the manure or refuse being operated upon.

Other objects, and objects relating to details of construction, combination and arrangement of parts will hereinafter appear in the detailed description to follow.

In carrying out the invention it is contemplated to provide a container or retort with a retainer therein which may be immersed in water and which may be filled with the manure or refuse to be treated. Heat is applied to the water and thus to cook the manure or refuse; and suitable means are also provided whereby to collect and condense some of the steam crated during the cooking process and thus to effect a saving of the ammonia or other volatile substances leaving the manure or refuse during the cooking period. After the manure is cooked a predetermined interval, then the same is subjected to a pressure whereby to separte the fertilizing elements from the wood and fiber in the manure or refuse. The liquid in the retort thus obtained is again cooked in order to evaporate the unnecessary water and reduce the same to the volume desired.

The invention is illustrated by way of example in the accompanying drawings, in which:—

Figure 1 is a perspective view of the apparatus showing the same when prepared for a cooking operation.

Figure 2 is a vertical sectional view of the same.

Figure 3 is a perspective view of the press which is utilized for submitting the manure or refuse to a presure after the cooking operation.

Figure 4 is a vertical sectional view of the cooker showing the press applied.

Figure 5 is a fragmentary perspective view of the container, of the manure or refuse container which is located in the cooker.

Figure 6 is a detailed view of a supporting rod utilized for suspending the manure container during the cooking operation.

Referring to the drawings more particularly, the cooker comprises a cylindrical shell 10 having its lower end provided with an enlarged hollow base 11 adapted to form a heating chamber 12 below the bottom 10' of the cylindrical shell 10. The base portion is provided with a door 13. The heat may be introduced into the chamber 12 in any desirable manner, that is, an oil or gas may be utilized for producing the heat by providing the necessary apparatus for utilizing the same, or electricity may be utilized if so desired without greatly departing from the construction of the device shown. The chamber existing within the shell 10 is the cooking chamber. The shell is formed with an outlet pipe 14 which may be closed by a screw plug 15. The shell may also have formed thereon suitable ears as at 16 whereby the same may be lifted.

Within the shell there is positioned a container C which is cylindrical in shape and slightly of less diameter than the shell 10. The container C is open at its top, as shown. The bottom 17 of the container is hingedly connected thereto as at 18. This bottom is also formed with the legs 19 and is perforated as at 20. The bottom may be held in its raised position by a latch member 21 carried by said bottom and adapted to engage a locking lug 22 carried by the side wall of the container. The container C is also perforated throughout its entire length as indicated at 23. Adjacent the upper end of the container there is formed a pair of diametrically opposed loops 24 whereby to lift the container from the shell 10. Also these loops serve to space the container within the shell 10 as illustrated in Figure 2. The container C is also provided at its upper end with diametrically opposed pairs of apertured ears 25, the purpose of which will later be described.

The cylindrical shell 10 has fitted thereon a cap K, said cap consisting in a body portion 26 having formed about its outer periphery a downwardly depending flange 27 adapted to fit tightly about the cylindrical shell 10. Also the cap may be formed with a pair of handles 26'. The cap K has extended therethrough a crank shaft 28, said crank shaft being encircled by a packing gland or packing box 29 to prevent leakage from the cylindrical shell 10, and said crank shaft carries a pair of collars 30 adapted to prevent longitudinal movement of the same. The crank shaft 28 is freely turnable and is provided with a handle 31 by which the same may be manually rotated. The lower end of the crank shaft 28 is threaded as at 32. Extending across the upper end of the container C is a supporting bar 33 which is formed at a point intermediate its ends with an interiorly threaded hub portion 34 adapted to receive the lower end of the shaft 32. The end portions 35 of the bar 33 are disposed laterally to said bar, and each portion is provided with an opening 36. The container C is also provided with openings which may be brought into register with the openings 36 of the bar 33 and thereby to permit the bar 33 to be bolted to said container. The crank 28 as is obvious affords a suspension means for the container C and also permits adjustable raising and lowering thereof. Any suitable packing means may be utilized in order that the cap K may form a tight fitting for the upper end of the cylindrical shell 10. The cap K has extended therefrom a pipe P which communicates with the interior of the cylindrical shell 10, and said pipe also communicating with a coil 37 which is disposed within the shell 38 whereby to provide a condenser. The pipe P may be detachably connected to the coil 37 by a coupling as at 39, and the lower end of the coil 37 may be provided with a discharge faucet 40. Any suitable means may be employed for continuously keeping water within the shell 38.

The pressing means for the apparatus is shown in Figure 3 and consists in a circular plate 41 which is formed upon its upper face with a protrusion 42 into which there is extended a rod or shaft 43, said shaft being loosely connected with the protrusion 42 as indicated at 44. The rod or shaft 43 is threaded, as shown, and carries a collar 45 which has arms 46 extending therefrom, each being provided with an apertured head 47 adapted to be disposed between a pair of apertured ears 25 of the container C. Suitable bolts may be utilized for detachably connecting the arms 46 to the apertured ears 25. The upper end of the rod or shaft 43 is formed with the handle 48 by which the same may be manually rotated.

In the use of present apparatus, the cap K is removed and the container C is filled with manure or refuse to be treated. The container C may be removed for this purpose if so desired. The container C is now positioned in the cylindrical shell 10 of the cooker, as illustrated in Figure 2, of the drawings and the cap K is likewise positioned as illustrated in this figure. The cap K is properly connected to the condenser coil 37 and the crank shaft 32 is threaded through the hub portion 34 of the supporting rod 33, and the container C raised so that the lower end thereof is in spaced relation with the bottom 10' of the cylindrical shell 10. The shell 10 is filled with water to any suitable predetermined level so that the contents within the container C is immersed within the water. Now heat is introduced into the heating chamber 12 and of such a degree that the water within the shell 10 will serve to cook the manure or refuse. The steam passing through the pipe P will be condensed in the coil 37 and any suitable means may be placed beneath the spigot 40 for collecting this condensate, said condensate containing ammonia and volatile substances within the manure or refuse being treated. After the cooking operation has been completed, which should be of sufficient time to enable a thorough separation of the fertilizer elements from the wood or fiber in the manure or refuse, the heat within the chamber 12 may be discontinued and the chamber C lowered so that the same may seat upon the bottom 10' of the shell 10. The cap K is now removed and also the supporting bar 33. The press plate 41 is now positioned within the top of the container C and the arms 46 of the collar 45 connected to the apertured ears 25 of the container C. The shaft or rod 43 may now be rotated in order to press the manure or refuse within the container. The manure or refuse should be sufficiently pressed so that all fertilizing elements are removed from the container C, that is, these elements will pass through the perforations of the container and into the liquid surrounding the same. After the pressing operation there should be nothing but wood, fiber or other material, which is of no value as a fertilizer within the container C. The container C may now be removed from the shell 10 and the material therein disposed of.

The liquid within the shell 10 represents the fertilizer product obtained by the press method, and if desired this might be again subjected to heat for evaporating the surplus water therein and thus reducing the same to the volume or quantity desired. The condensed liquid taken off through the coil 37 may be poured into the remaining condensed liquid within the tank 10 and thus all the fertilizing elements from the manure or refuse are saved. This remaining liquid may be stored in barrels or cans for transporting to any place desired for the use thereof.

It is also important to here mention that during the cooking of the refuse or manure it is desireable to include with the manure or refuse a certain quantity of slacked-lime, and this lime will increase the value of the fertilizer produced. Furthermore any other fertilizing element that is desirable may be introduced either before or after the cooking operation.

By this method the weight of manure is reduced substantially to one-eight of original weight and bulk, yet containing each and every element essential to plant life.

It is further pointed out that with the present invention, the accumulation for centuries of vegetable matter located a great distance from modern conveyances and far removed from the markets and places of usage may be taken and the essential elements to plant life extracted and securely sealed up in containers so as to make it especially profitable and convenient for shipment to any place desired; and without the delay of decomposition which is invariably attended with the loss of a very large quantity of nitrogen escaping into the air. The fertilizer in liquid form is most convenient to handle and of application for orchards, florist, lawns and innumerable places where the sight and odor of manure, in its natural state, is both offensive, expensive and slow in its action. The liquid fertilizer containing all the essential elements has an immediate action upon plant life.

While I have shown and described the preferred form of my invention, I wish it to be understood that I am aware of the fact that the construction, combination and arrangement of parts may be changed by those skilled in the art without departing from the spirit of the invention, as indicated by the appended claims.

I claim:—

1. The method of extracting fertilizer elements from manure which consists in cooking manure in an aqueous suspension, and then submitting the manure to pressure while in said suspension.

2. The method of extracting fertilizer elements from manure which consists in cooking manure in an aqueous suspension containing lime, and then submitting the manure to pressure while in said suspension.

3. The method of extracting fertilizer from manure which consists in cooking manure in an aqueous suspension, and then mechanically pressing the cooked mass to recover the fertilizer elements.

COLL E. GARDAN.